United States Patent
Li et al.

(10) Patent No.: US 9,873,171 B2
(45) Date of Patent: Jan. 23, 2018

(54) METHOD FOR HOLDING BRAZING MATERIAL DURING A BRAZING OPERATION

(71) Applicant: Siemens Energy, Inc., Orlando, FL (US)

(72) Inventors: Hang Li, Charlotte, NC (US); Mark A. Garcia, Pfafftown, NC (US); Somesh J. Ghunakikar, Orlando, FL (US); William J. Lowe, Pfafftown, NC (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 15/348,997

(22) Filed: Nov. 11, 2016

(65) Prior Publication Data

US 2017/0057024 A1 Mar. 2, 2017

Related U.S. Application Data

(62) Division of application No. 14/306,679, filed on Jun. 17, 2014.

(51) Int. Cl.
*B23K 35/12* (2006.01)
*B23P 6/04* (2006.01)
(Continued)

(52) U.S. Cl.
CPC .............. *B23P 6/045* (2013.01); *B23K 1/00* (2013.01); *B23K 1/0018* (2013.01); *B23K 1/206* (2013.01);
(Continued)

(58) Field of Classification Search
CPC ........ B23K 1/00; B23K 1/0018; B23K 1/206; B23K 37/06; B23P 6/007; B23P 6/04;
(Continued)

(56) References Cited

U.S. PATENT DOCUMENTS

| | | |
|---|---|---|
| 3,031,996 A | 5/1962 | Botvin |
| 4,040,159 A | 8/1977 | Darrow et al. |

(Continued)

FOREIGN PATENT DOCUMENTS

JP 2009148785 7/2009

OTHER PUBLICATIONS

How to Patch Drywall—by Home Repair Tutor, https://www.youtube.com/watch?v=jhfz2HNuL7s, Oct. 11, 2013.*
(Continued)

*Primary Examiner* — Erin Saad
*Assistant Examiner* — Carlos Gamino (57) ABSTRACT

A method for holding a sintering filler material during a brazing/sintering operation for repairing a damaged area of a component wherein the component is in either a bonding face down position, bonding face vertical position or bonding face up position. The method includes providing a wire mesh and attaching the wire mesh to the component in a location corresponding to the damaged area. Further, the method includes forming a gap between the wire mesh and the component. Moreover, the sintering filler material may be inside the wire mesh or both inside and outside the wire mesh in order to secure the sintering filler material to the damaged area.

7 Claims, 6 Drawing Sheets

(51) Int. Cl.
*B23K 1/00* (2006.01)
*B23P 6/00* (2006.01)
*F01D 5/00* (2006.01)
*B23K 1/20* (2006.01)
*B23K 37/06* (2006.01)
*B23K 3/08* (2006.01)
*B23K 101/00* (2006.01)
*F01D 9/02* (2006.01)

(52) U.S. Cl.
CPC .............. *B23K 3/087* (2013.01); *B23K 37/06* (2013.01); *B23P 6/007* (2013.01); *B23P 6/04* (2013.01); *F01D 5/005* (2013.01); *B23K 2201/001* (2013.01); *F01D 9/02* (2013.01); *F05D 2220/32* (2013.01); *F05D 2230/22* (2013.01); *F05D 2230/80* (2013.01); *F05D 2300/175* (2013.01)

(58) Field of Classification Search
CPC ...... B23P 6/045; F01D 5/005; F05D 2230/22; F05D 2300/175
See application file for complete search history.

(56) References Cited

U.S. PATENT DOCUMENTS

| | | |
|---|---|---|
| 4,843,693 A | 7/1989 | Chisholm |
| 9,254,537 B2 | 2/2016 | Li et al. |
| 2009/0229101 A1 | 9/2009 | Ahmad et al. |
| 2010/0187290 A1 | 7/2010 | Holi |
| 2012/0111928 A1 | 5/2012 | Park et al. |
| 2013/0101828 A1 | 4/2013 | Park et al. |
| 2015/0090773 A1 | 4/2015 | Schick et al. |
| 2015/0343574 A1 | 12/2015 | Ozbaysal |
| 2015/0360328 A1 | 12/2015 | Li et al. |

OTHER PUBLICATIONS https://www.youtube.com/watch?v=ZqV4MOdNO4A,"FibaTape® Perfect Finish™—How-To Install", Uploaded May 18, 2009.

\* cited by examiner

METHOD FOR HOLDING BRAZING MATERIAL DURING A BRAZING OPERATION

CROSS REFERENCE TO RELATED APPLICATIONS

This application is a divisional application of U.S. patent application Ser. No. 14/306,679, filed Jun. 17, 2014, and entitled METHOD FOR HOLDING BRAZING MATERIAL DURING A BRAZING OPERATION which is hereby incorporated by reference in its entirety. The entire disclosure of U.S. patent application Ser. No. 14/134,212, filed on Dec. 19, 2013, and entitled PLURAL LAYER PUTTY-POWDER/SLURRY APPLICATION METHOD FOR SUPERALLOY COMPONENT CRACK VACUUM FURNACE HEALING is hereby incorporated by reference in its entirety.

FIELD OF THE INVENTION

The invention relates to methods for performing a high temperature vacuum brazing/sintering operation, and more particularly, to a method for holding a sintering filler material with a wire mesh to enable repairing of a damaged area of a component when the component is in different orientations against gravity, either a bonding face down position, bonding face vertical position or bonding face up position to minimize possible negative impacts of gravity on this operation.

BACKGROUND OF THE INVENTION

A typical gas turbine engine includes a compressor section, a combustion section and a turbine section. The compressor section provides a compressed air flow to the combustion section where the air is mixed with a fuel, such as natural gas, and ignited to create a hot working gas. The working gas expands through the turbine section where it is directed across rows of blades therein by associated vanes. As the working gas passes through the turbine section, it causes the blades to rotate, which in turn causes a shaft to rotate, thereby providing mechanical work.

Gas turbine engines are periodically inspected to detect different types of damage such as erosion, oxidation, all types of fatigue cracking and creep and fretting defects that are formed in various turbine components as a result of operation of the turbine. The existence of such damage compromises operation of the gas turbine and may jeopardize safety. Since turbine components are very expensive to fabricate, it is desirable to repair a turbine component instead of replacing the component.

A brazing process may be used to repair a turbine component. It is well known that gravity affects brazing processes and thus the quality of a brazed joint. In particular, Section IX of the American Society of Mechanical Engineers ("ASME") Boiler and Pressure Vessel Code standard, entitled "Welding Qualifications and Brazing Qualifications," sets forth that brazing orientation is a quality control item used in determining the quality of a brazed joint. An acceptable brazing operation utilizes the combined effects of gravity (i.e. a gravity force) and a capillary force on a liquid braze material to provide sufficient spreading and filling of the liquid braze material in a braze joint. In a preferred brazing orientation, both the capillary force and gravity force act on the braze filler material in approximately the same direction in order to enhance the spreading and filling actions of the liquid braze material in the braze joint. In an undesirable brazing orientation, the gravity force works against the capillary force, thus reducing the spreading and filling of the liquid braze material in the braze joint.

Figure 1:
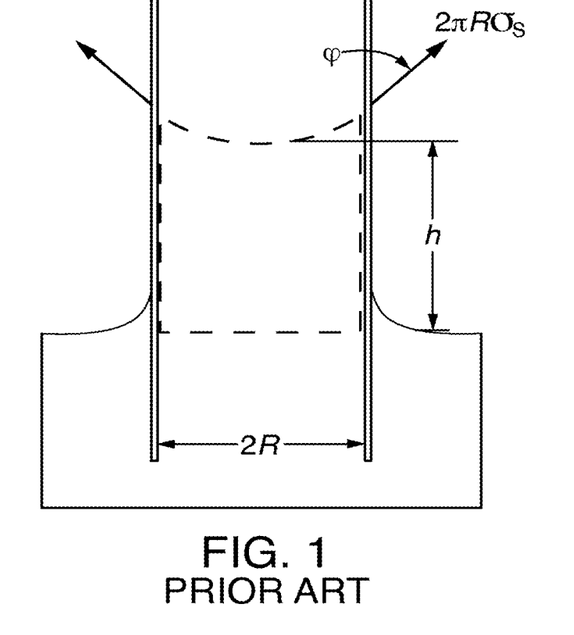
FIG. 1 shows the mathematical variables used in a capillary rise equation.

A type of brazing is transient liquid phase ("TLP") bonding which is used for manufacturing and repairing components in a gas turbine hot section. TLP bonding uses a known capillary action, caused by a crack in the component or by a narrow braze gap set between two parts which are to be joined together to form a component, to draw liquid braze material into the crack or gap to fill in and repair the crack or form the braze joint. The effect of crack or gap size on capillary action during a brazing operation will now be quantitatively described by reference to FIG. 1 and a capillary rise calculation in a tube given by:

$$h = \frac{2\sigma_s \cos\varphi}{\rho g R} \quad \text{Eq. (1)}$$

where h is the capillary rise, $\sigma_s$ is as the liquid-air surface tension, $\varphi$ is the contact angle, $\rho$ is the density of liquid braze, g is gravity, and R is radius of a tube.

Since capillary force decreases with increasing width of a crack (increased R in Eq. (1) and thus reduced h), the repair of large cracks will be even further influenced by gravity. Typically, crack size changes from one damage area to another damage area on a damaged component. Therefore, capillary force varies and is a challenging process variable for braze repair operations.

Figure 2:
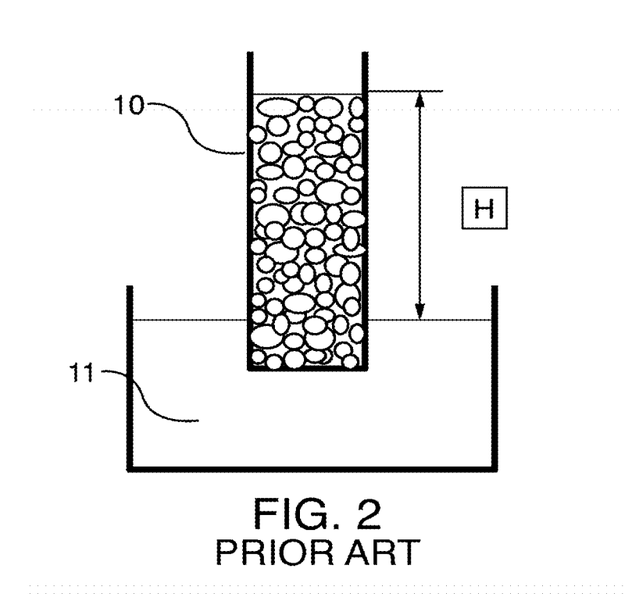
FIG. 2 shows a sintered alloy sponge extracting a liquid braze material.

TLP bonding is typically used to repair relatively narrow cracks. In order to repair wide cracks or gaps, brazing/sintering repair methods are utilized wherein multi-layer filler structures are formed in which braze and alloy fillers are separately added. Referring to FIG. 2, multi-layer filler structures rely on the infiltration of liquid braze material 11 in a sintered alloy powder sponge 10. With respect to the sponge 10, it is the average inter-powder particle spacing within the sponge 10, not the tube or crack size, that determines capillary rise H ("H" therefore is greater than "h"). Multi-layer structures have advantages relative to the TLP bonding methods. An advantage is that by replacing crack gap size with average sponge inter-powder spacing, R in Eq. 1 is significantly reduced, resulting in a substantially increased capillary action and capillary force. This may then be used to minimize the undesirable effects due to gravity on the braze material. Another advantage is that crack size is substantially eliminated as a process variable for capillary action.

Figure 3A:
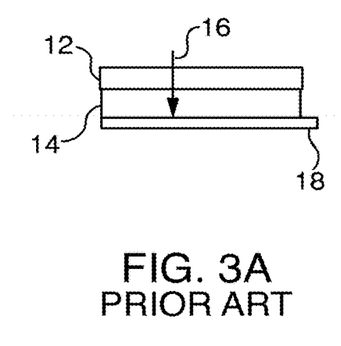
FIGS. 3A-3C are schematic representations of brazing/sintering orientations for braze and alloy powders used in multi-layer sintering.
Figure 3B:
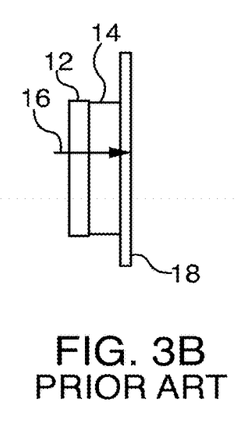
Figure 3C:
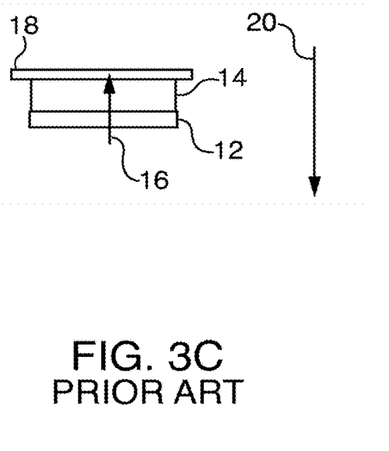

Referring to FIGS. 3A-3C, schematic representations of brazing/sintering orientations for exemplary first 12 and second 14 powders used in multi-layer sintering are shown. In a putty/putty multi-layer configuration, the first powder 12 is a braze powder and the second powder 14 is an alloy powder and the previously described sponge capillary action occurs in the second powder 14. In FIGS. 3A-3B, arrows 16 illustrate a braze capillary flow and desirable filler consolidation direction toward a substrate 18 and arrow 20 illustrates the direction of gravity. FIG. 3A depicts a bonding face down position wherein the braze capillary flow direction 16 is the same as the direction of gravity 20. Therefore, the bonding face down position is a preferred brazing/sintering orientation. FIG. 3B depicts a bonding face vertical position wherein the braze capillary flow direction 16 is transverse to the direction of gravity 20. In addition, FIG. 3C depicts a bonding face up position wherein the braze capillary flow direction 16 is opposite the direction of gravity 20. Alternatively, in a braze tape configuration, the first powder 12 is an alloy powder and the second powder 14 is a braze powder and the sponge capillary action occurs in the first powder 12.

Multi-layer structures utilize heavier filler mass than that used in TLP methods. This adds to the undesirable effects due to gravity on a repair with respect to positions other than the bonding face down position. A first undesirable effect is possible repair filler detachment (or partial detachment) at repair sites which could lead to repair failure. This occurs since gravity works against filler/repair site adhesion and also since organic adhesives/binders will be burned out at temperatures far lower than braze melting temperatures. A second undesirable effect is repair filler creep, due to gravity, during a transient semi-liquid stage of the repair process which leads to poor repair dimension control. A third undesirable effect is that gravity influences the sponge infiltration process which could lead to a poor sintered deposit/base alloy bonding interface. A fourth undesirable effect is that gravity influences a repair filler consolidation process during and immediately after liquid braze infiltration, resulting in increased porosities in sintered filler deposits.

The first and second undesirable effects are the most pressing since the repairs may fail on a macroscopic scale. The possibility of macroscopic repair failures are particularly high if the sintering filler material deposits are very heavy when dealing with severe erosion damage repairs. The third and fourth undesirable effects occur on a microscopic level and are critical for sintering repair qualification.

Current industrial practices for overcoming the undesirable effects due to gravity include positioning a component which is to be repaired into an orientation which minimizes the effect of gravity on the sintering/brazing process. However, if multiple damaged areas exist on the component, multiple furnace brazing cycles are typically required which significantly increases processing time and repair cost. Further, multiple brazing cycles increase the possibility of repair site re-contamination resulting in reduced repair quality. Therefore, additional cleaning operations may be required, thus further increasing costs.

SUMMARY OF INVENTION

A method is disclosed for holding a sintering filler material during a brazing/sintering operation for repairing a damaged area of a component wherein the component is in either bonding face vertical position or bonding face up position. The method includes providing a wire mesh and attaching the wire mesh to the component in a location corresponding to the damaged area by any low cost and low heat input precision fusion welding method such as micro resistance spot welding. In one embodiment, the sintering filler material is pushed through the mesh thereby inserting the sintering filler material between the wire mesh and the damaged area thus securing the sintering filler material. Alternatively, a first quantity of sintering filler material is applied to the damaged area before the wire mesh is attached. The wire mesh is then attached to the component such that the wire mesh is on top of and contacts the first quantity while also surrounding the first quantity thus forming a gap. A second quantity of sintering filler material is then applied onto the wire mesh such that the wire mesh is at an interface between the first and second quantities of sintering filler material. In another technique, a full quantity of sintering filler material equivalent to the first and second quantities is applied to the damaged area before the wire mesh is attached. The wire mesh is then positioned over the full quantity of sintering filler material and attached to the component such that the wire mesh surrounds the amount to form a gap.

In addition, a method is disclosed for holding double layer brazing repair tape during a brazing/sintering operation for repairing a damaged area of a component wherein the component is in either a bonding face vertical position or bonding face up position. The method includes providing a wire mesh and positioning the brazing tape in a location corresponding to the damaged area. The method also includes positioning the wire mesh over the brazing tape and attaching the wire mesh to the component to hold the brazing tape against the damaged area. In this method, braze alloy powder can be in direct contact with the component, while alloy powder is located on top of the repair tape.

The respective features of the present invention may be applied jointly or severally in any combination or subcombination by those skilled in the art.

BRIEF DESCRIPTION OF DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as web as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

In order to repair cracks or gaps in a turbine component, brazing/sintering repair methods are utilized which include the use of a sintering filler material wherein multi-layer filler structures are formed and alloy fillers are separately added. Examples of multi-layer filler structures include putty/putty two layer and plural layer putty-powder/slurry configurations such as those described in U.S. patent application Ser. No. 14/134,212, filed on Dec. 19, 2013, and entitled PLURAL LAYER PUTTY-POWDER/SLURRY APPLICATION METHOD FOR SUPERALLOY COMPONENT CRACK VACUUM FURNACE HEALING, and braze tape such as double layer braze tape. However, due to gravity and brazing orientation, the sintering filler material may detach or partially detach at a repair site. In addition, the sintering filler material may creep due to the effects of gravity during a transient semi-liquid phase stage of the repair process.

Figure 4A:
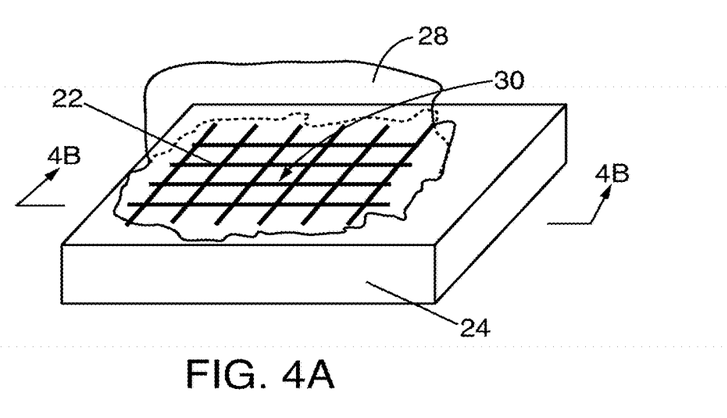
FIG. 4A shows a wire mesh attached to a component in accordance with the invention.
Figure 4B:
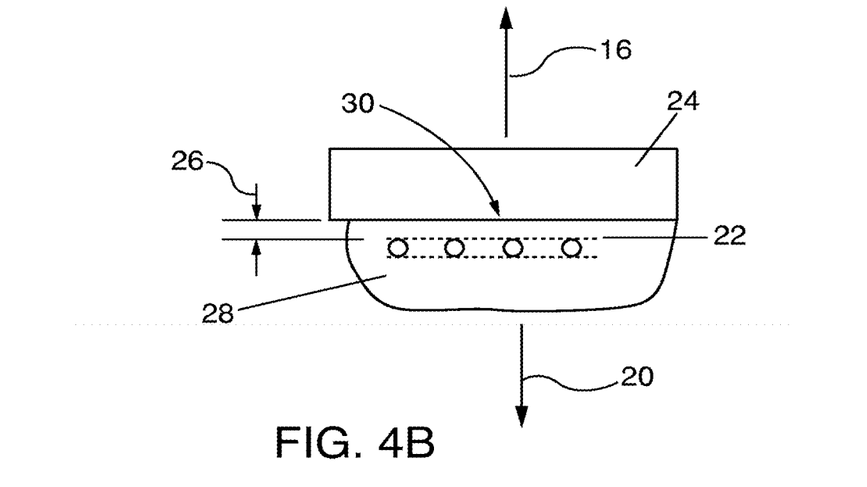
FIG. 4B is a cross sectional view along view line 4B-4B of FIG. 4A.

Referring to FIG. 4A, a wire mesh 22 attached to a component 24, such as a turbine component, is shown. The wire mesh 22 is positioned in a location adjacent or corresponding to a repair site 30 of the component 24 that includes a damaged area to be repaired. The wire mesh 22 is attached to the component 24 by any low cost and low heat input precision fusion welding method such as micro resistant spot welding, tungsten inert gas ("TIG") tack welding or other suitable attachment method. In addition, the wire mesh 22 is sized to correspond to the size of the repair site 30 on the component 24. Referring to FIG. 4B, a cross sectional view along view line 4B-4B of FIG. 4A is shown which depicts a bonding face up position (see FIG. 3C) wherein a braze capillary flow direction 16 is opposite the direction of gravity 20. Upon attachment of the wire mesh 22, a gap 26 may be formed between the wire mesh 22 and the repair site 30. Repair site 30 should be free from contaminants sufficient to ensure wetting and spreading of braze material during a furnace operation. This can be achieved by either fluoride ion cleaning or through mechanical blending. If fluoride ion cleaning is used, the cleaning process may be performed either before or after wire mesh 22 attachment procedures are performed. Mechanical blending should be carried out before wire mesh 22 attachment procedures are performed. The sintering filler material 28 is then applied or pushed through the wire mesh 22 thus inserting the sintering filler material 28 between the wire mesh 22 and the repair site 30 so that the sintering filler material 28 substantially fills in the gap 26 and covers the repair site 30. The sintering material 28 also covers substantial portions of the wire mesh 22 so as to embed the wire mesh 26 in sintering filler material 28. The wire mesh 22 holds the sintering filler material 28 against the repair site 30. The gap 26 may also be formed due to the sintering filler material 28 being inserted between the repair site 30 and the wire mesh 22 when the sintering filler material 28 is pushed through the wire mesh 22.

Alternatively, a first quantity of sintering filler material 28 is applied to the repair site 30 before the wire mesh 22 is attached. The wire mesh 22 is then positioned over the first quantity. The wire mesh 22 is then attached to the component 24 such that the wire mesh 22 is on top of and contacts the first quantity while also surrounding the first quantity thus forming the gap 26. A second quantity of sintering filler material 28 is then applied onto the wire mesh 22 such that the wire mesh 22 is at an interface between the first and second quantities of sintering filler material 28. In another technique, a full quantity of sintering filler material 28 equivalent to the first and second quantities is applied to the repair site 30 before the wire mesh 22 is attached. The wire mesh 22 is then positioned over the full quantity of sintering filler material 28 and attached to the component 24 such that the wire mesh 22 surrounds the full amount to form the gap 26 as previously described. In one embodiment, the sintering filler material 28 may be formed by a putty/putty two layer method. Alternatively, the sintering filler material 28 may be formed by a plural layer putty-powder/slurry method. The component 24 is then exposed to a vacuum furnace brazing/sintering thermal cycle during which the sintering filler material 28 enters a transient semi-liquid phase stage of a repair process. In accordance with the invention, the wire mesh 22 hinders or stops undesirable creep of the sintering filler material 28 during the semi-liquid stage of the repair process thus maintaining desired dimensions of sintering filler material 28. In addition, the wire mesh 22 enhances adhesion of the sintering filler material 28 to the repair site 30 so as to prevent possible filler material detachment during the vacuum furnace thermal cycle.

Upon completion of the vacuum furnace thermal cycle, a sintering deposit is formed at the repair site 30. Portions of the wire mesh 22 which were in contact with the sintering filler material 28 become fused into the repair site 30 and become part of the repair. Therefore, it is important that the wire mesh 22 is fabricated from a material that is metallurgically compatible with the sintering filler material 28. For example, the wire mesh 22 may be fabricated from a Nickel or Cobalt base alloy. The sintering deposit may also have excessive portions. The sintering deposit is then mechanically blended so as to remove the excessive portions in order to restore the original dimensions of the component and to remove residual wire mesh portions that did not become fused.

Figure 5:
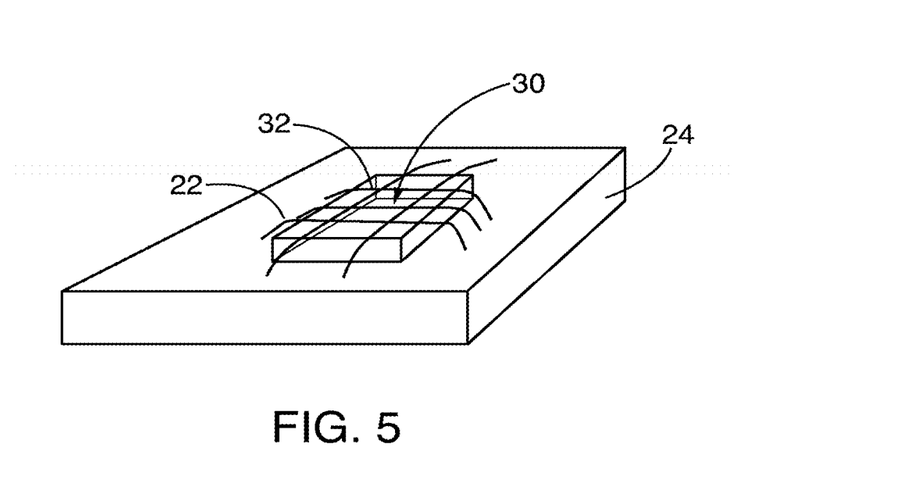
FIG. 5 shows an alternate embodiment of the invention wherein the wire mesh holds brazing tape.

Referring to FIG. 5, an alternate embodiment of the invention is shown. In this embodiment, the wire mesh 22 may be used with other types of repair materials such as commercially available double layer brazing tape 32. The brazing tape 32 is cut into a size suitable for accommodating the repair site 30 and is attached to the component 24 with an organic adhesive in a location corresponding to the damaged area. As previously described, the repair site 30 should be free of contaminates to ensure braze wetting and spreading. The wire mesh 22 is then cut into a size suitable for accommodating the brazing tape 32. The wire mesh 22 is then positioned over the brazing tape 32 and is spot welded to the component 24. The wire mesh 22 holds the brazing tape 32 against the repair site 30. Next, the component 24, including the brazing tape 32 and wire mesh 32, is exposed to a vacuum furnace brazing/sintering thermal cycle as previously described.

Test Results

Tests were conducted to verify the effectiveness of the invention. In the tests, INCONEL 738 alloy and BNi-9 material (i.e. Nickel based brazing filler metal with Boron) were selected as sintering filler materials and INCONEL 625 alloy for the wire mesh. The tests were carried out on scraped turbine vane components made from INCONEL 939 cast grade superalloy. Fluoride ion cleaning was applied to the test components before sintering repair trials. The tests were conducted in orientations which provide undesirable gravity effects such as the bonding face vertical or bonding face up positions. Test results were examined by visual inspection and destructive metallographic evaluations to access the effectiveness of the invention on minimizing macroscopic and microscopic scale repair issues due to undesirable gravity effects.

Figure 6A:
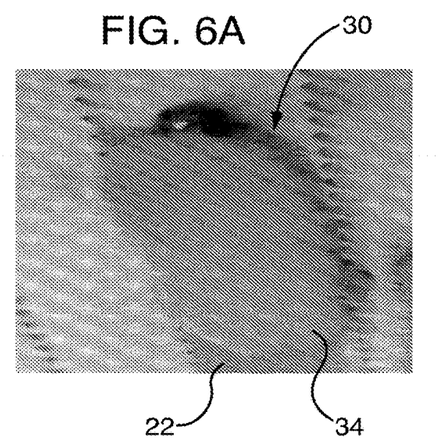
FIGS. 6A and 6B are before and after photographs of a component repair performed in a bonding face vertical position using a putty/putty two layer configuration and wire mesh.
Figure 6B:
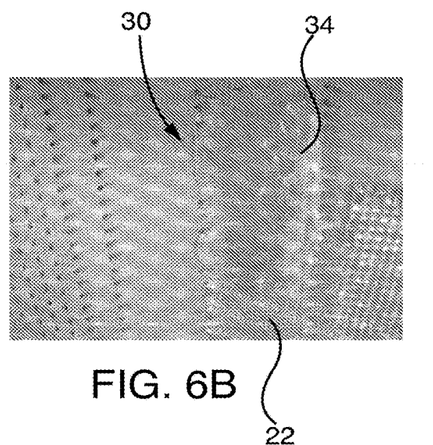
Figure 7A:
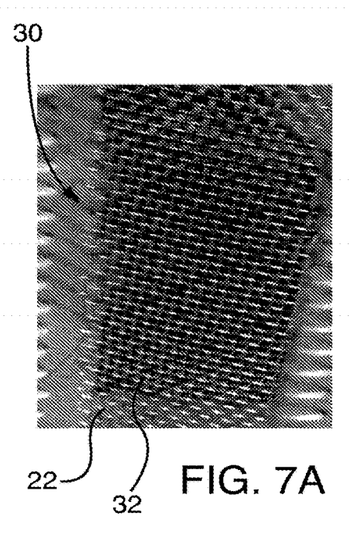
FIGS. 7A and 7B are before and after photographs of a component repair performed in a bonding face vertical position using brazing tape and wire mesh.
Figure 7B:
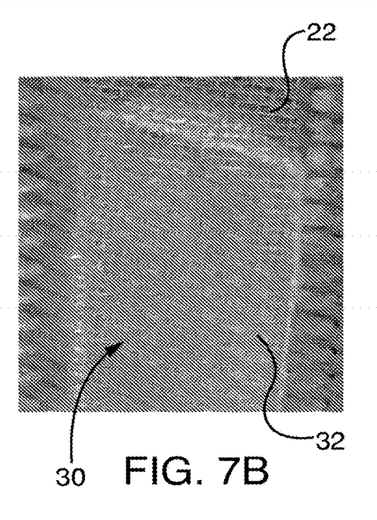

FIG. 6A is a photograph of a repair using a putty/putty two layer configuration 34 and wire mesh 22 before a vacuum furnace run. FIG. 6B is a photograph of the repair after the vacuum furnace run. The repair was performed in a bonding face vertical position (see FIG. 3B). FIG. 7A is a photograph of a repair using brazing tape 32 and wire mesh 22 before a vacuum furnace run. FIG. 7B is a photograph of the repair after the vacuum furnace run. This repair was also performed in a bonding face vertical position. In both cases, the invention hindered or stopped the putty/putty two layer configuration 34 and brazing tape 32 from being detached at the repair site 30 when the repair was performed in a bonding face vertical position.

Figure 8A:
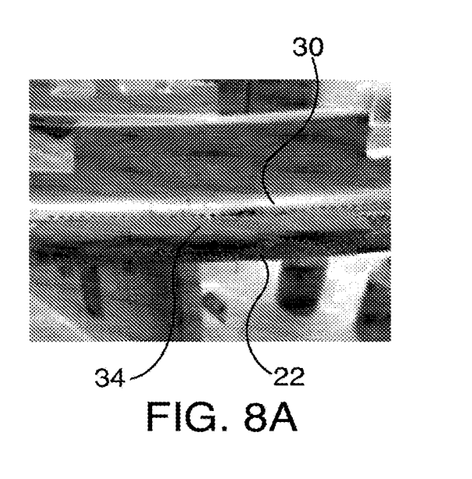
FIGS. 8A and 8B are before and after photographs of a heavy sintering repair performed in a bonding face up position using the putty/putty two layer configuration and wire mesh.
Figure 8B:
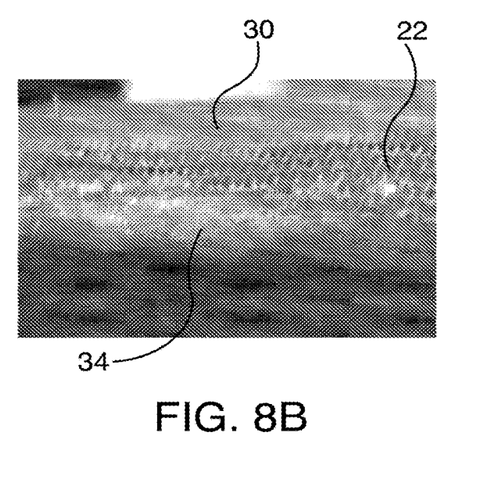

FIG. 8A is a photograph of a heavy sintering repair using the putty/putty two layer configuration 34 and wire mesh 22 before a vacuum furnace run. In particular, the sintering filler material 28 was over 2 mm thick after sintering filler material consolidation. FIG. 8B is a photograph of the repair after the vacuum furnace run. The repair was performed in a bonding face up position (i.e. worst case gravity effect—see FIG. 3C). As can be seen, the invention prevented the putty/putty two layer configuration 34 from being detached at the repair site 30.

Figure 9:
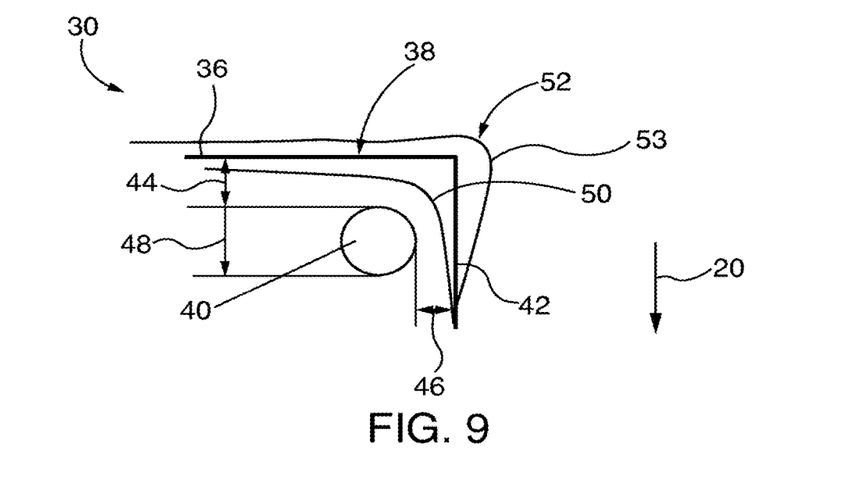
FIG. 9 shows a repair site which includes damage at a vane platform edge due to heavy erosion.

Referring to FIG. 9, a repair performed at a repair site 30 located near an edge of a platform 38 of a turbine vane having a cooling channel 40 is depicted. At repair site 30, material near an edge of the platform 38 was removed due to erosion caused by operation of the turbine, thus changing the dimensions near the edge of the platform 38. The repair was directed to restoring the repair site 30 to its original dimensions as defined by upper surface 36 and side surface 42. The cooling channel 40 is spaced apart from the upper surface 36 by a first distance 44 and from the side surface 42 by a second distance 46. In the embodiment tested, the first 44 and second 46 distances were approximately 3 mm and 2.5 mm, respectively, and the cooling channel 40 had a diameter 48 of approximately 5 mm. The upper 36 and side 42 surfaces were heavily eroded and exhibited thermal-mechanical fatigue cracking at the repair site 30 due to operation of the turbine such that the upper 36 and side 42 surfaces form a rounded contour profile 50 which was closer to the cooling channel 40 than the upper 36 and side 42 surfaces. The challenges for this repair include heavy sintering build up, which is required in order to compensate for material lost due to erosion, and the need for a relatively sharp corner at the heaviest sintering deposit location 52. Under the effect of gravity in direction 20, and without implementation of the current invention, the repair filler will creep making the formation of a sharp corner at the heavy sintering deposit location 52 difficult. By using the wire mesh 22 in accordance with the invention to repair the upper 36 and side 42 surfaces, a desirable sharp corner 53 of sintering deposit was established at the intersection of the upper 36 and side 42 surfaces and a component dimension restoration requirement was met.

Figure 10A:
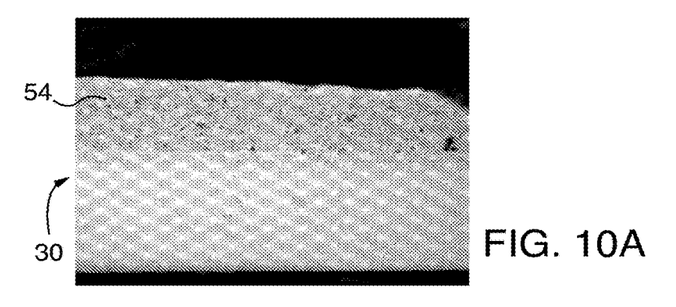
FIGS. 10A, 10B and 10C are micro images which show a cross section of micro structures of sintered fillers of the repairs previously described in relation to FIGS. 6B, 7B and 8B, respectively.
Figure 10B:
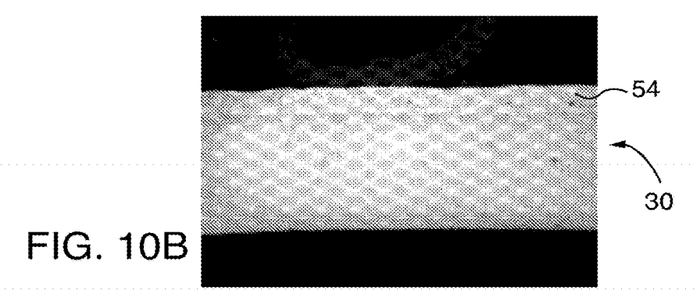
Figure 10C:
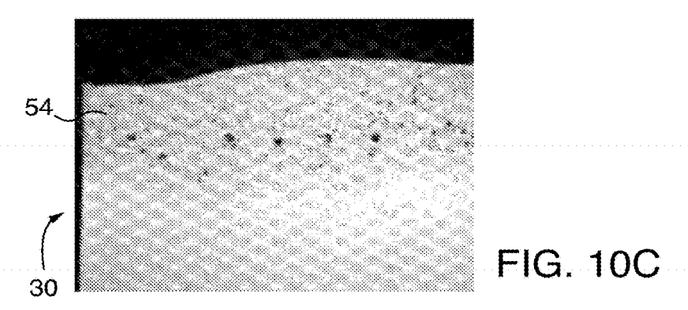
Figure 11:
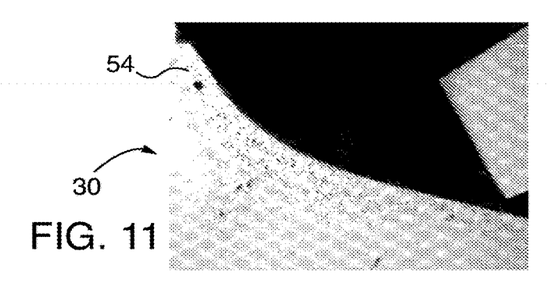
FIG. 11 is a micro image which shows a cross section of micro structures of a repair site using a plural layer configuration without the wire mesh and performed in a bonding face down orientation.

Metallographic inspections were conducted to determine whether repairs performed in accordance with the invention comply with Siemens specifications. FIGS. 10A, 10B and 10C are micro images which show a cross section of micro structures of sintered fillers of the repairs previously described in relation to FIGS. 6B, 7B and 8B, respectively. For comparison purposes, FIG. 11 is a micro image which shows a cross section of micro structures of a repair site using a plural layer configuration without the wire mesh 22 and performed in a bonding face down orientation.

FIGS. 10A-10C and FIG. 11 clearly reveal the following findings. The first finding is that the INCONEL 625 wire mesh has been fused into the sintered INCONEL 738 deposits and further, no detrimental micro structure was found. Second, a sintering deposit 54 was formed which provided satisfactory metallic bonds with the base alloy indicating that the current invention overcomes a possible undesirable effect regarding the influence of gravity on the braze liquid-superalloy powder sponge infiltration process. Further, although porosities tended to increase when the sintering consolidation direction was against gravity and the deposit was heavy, the outcome still met basic Siemens specifications therefore establishing that current invention efficiently minimizes the undesirable effects of gravity regarding increased porosities in sintered deposits such that basic repair microstructure qualification specifications are met.

Therefore, the invention minimizes the undesirable effects due to gravity on available multi-layer types of brazing/sintering filler repair application methods to prevent macroscopic scale repair failures such as filler detachment and improve the dimension restoration capabilities of these repair methods. The invention also minimizes the undesirable effects due to gravity on any available multi-layer types of brazing/sintering filler repair application methods to produce repair deposits that are able to meet relevant microscopic braze qualification standards. Further, the invention eliminates brazing/sintering orientation restrictions for vacuum furnace brazing/sintering repairs for components with multiple damage locations to enable completion of the repair in one furnace cycle operation, thus reducing production costs and providing repair quality improvements. In addition, the invention enables multi-layer types of heavy brazing/sintering repair of multiple damage sites positioned in any brazing/sintering orientation while still meeting the brazing repair quality requirements on both macroscopic and microscopic scales. The current invention also maintains the advantages of wide gap repair methods.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for holding a sintering filler material during a sintering operation for repairing a damaged area of a component wherein the component is in either a bonding face down position, bonding face vertical position or bonding face up position, comprising:

attaching a first quantity of sintering filler material to the damaged area;

positioning a wire mesh over the first quantity of sintering filler material;

attaching the wire mesh to a non-damaged surface of the component such that a gap portion of the wire mesh forms a gap between both the damaged and non-damaged areas of the component wherein the sintering filler material fills the gap and the wire mesh hinders creep of the sintering filler material; and attaching a second quantity of sintering filler material onto the wire mesh.

2. The method according to claim 1 further including cleaning the damaged area by performing a fluoride ion cleaning procedure for the component or localized grinding on the damaged area.

3. The method according to claim 1 wherein the sintering filler material includes a multi-layer filler structure.

4. The method according to claim 3 wherein the multi-layer filler structure includes a putty/putty two layer configuration.

5. The method according to claim 3 wherein the multi-layer filler structure includes a plural layer putty-powder/slurry configuration.

6. The method according to claim 1 wherein the wire mesh is attached to the component by a fusion welding method.

7. The method according to claim 1 wherein the wire mesh is fabricated from a material which is metallurgically compatible with sintering filler material.

* * * * *